United States Patent

Degginger et al.

[15] 3,674,878

[45] July 4, 1972

[54] PROCESS FOR CONTROLLING NEMATODES

[72] Inventors: Edward R. Degginger, Convent Station, N.J.; Frederick J. Goetz, Tacoma Park, Md.

[73] Assignee: Allied Chemical Corporation, New York, N.Y.

[22] Filed: May 4, 1970

[21] Appl. No.: 34,559

[52] U.S. Cl. ............................................................424/330
[51] Int. Cl. ..........................................................A61n 9/20
[58] Field of Search.................................................424/330

[56] References Cited

OTHER PUBLICATIONS

Stahl et al., Chem. Abst. Vol. 39 pages 3111–3112, 1944.

*Primary Examiner*—Albert T. Meyers
*Assistant Examiner*—Allen J. Robinson
*Attorney*—Arthur J. Plantamura

[57] ABSTRACT

Process for controlling nematodes by treating nematode infested soil with a toxic quantity of 4-aminobiphenyl or a derivative thereof which is capable of being hydrolyzed to 4-aminobiphenyl.

1 Claim, No Drawings

PROCESS FOR CONTROLLING NEMATODES

BACKGROUND OF THE INVENTION

Plants infested by nematodes will present a weakened, sickly appearance without visible injury to the stem or any part of the plant above ground. An examination of roots will show numerous knots or galls characterized by a swollen appearance. In cases of severe infestation, gall formation not only reduces the size and effectiveness of the root system, but also seriously affects other plant parts so that unless treated, the plant dies.

DETAILED DESCRIPTION

It is an object of the present invention to provide a method of controlling nematodes by treating nematode-infested soil with a toxic quantity of a nematocide which is capable of thoroughly permeating the soil and incapacitating the nematode population therein.

As used in this specification and in the appended claims, the term "controlling nematodes" means incapacitating a sufficient number of nematodes, for example by killing or paralyzing them, so as to substantially reduce the injurious effect of the nematodes on plant appearance and growth. Thus, the nematocide does not necessarily have to kill all nematodes present in the soil in order to be effective. Generally incapacitation of at least 50 percent of the nematodes is clearly advantageous. However, incapacitation of at least about 70 percent is preferred, with incapacitation of at least about 90 percent being most preferred.

It has now been discovered that control of nematodes may be effected by treating nematode-infested soil with a toxic quantity of a nematocide selected from the group consisting of a 4-aminobiphenyl, having the formula

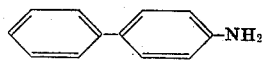

and derivatives thereof which are capable of being hydrolyzed, preferably in the soil, to 4-aminobiphenyl.

Suitable derivatives of 4-aminobiphenyl, i.e. those derivatives which are capable of being hydrolyzed back to 4-aminobiphenyl, include 4-isocyanato biphenyl, having the formula

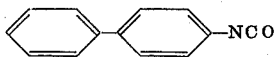

4-isothiocyanato biphenyl, having the formula

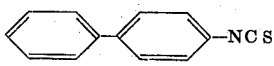

salts of 4-aminobiphenyl, amides and thioamides of 4-aminobi-phenyl, 4-biphenyl carbamates, 4-biphenyl thiocarbamates and 4-biphenyl dithiocarbamates.

The salts of 4-aminobiphenyl preferred for use in this invention are the stable salts of mineral acids, most preferably the salts of $H_2SO_4$ and HCl.

The amides and thioamides of 4-aminobiphenyl used in this invention have the respective formulas:

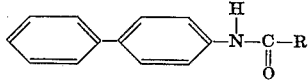

and

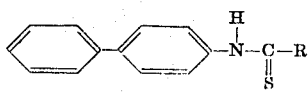

wherein R contains from one to eight carbon atoms and is selected from the group consisting of alkyl, alkenyl, aryl, alkaryl, aralkyl and cycloalkyl. Preferably R is an alkyl radical of one to three carbon atoms.

The 4-biphenyl carbamates, 4-biphenyl thiocarbamates, and 4-biphenyl dithiocarbamates used in this invention have the respective formulas

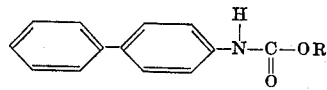

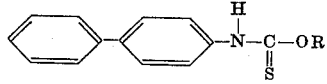

and

wherein R is defined as above.
Illustrative of suitable R groups are

—$CH_3$, —$CH(CH_3)_2$, —$CH_2CH_2CH_3$, —$CH_2CH(CH_3)(CH_2)_4CH_3$

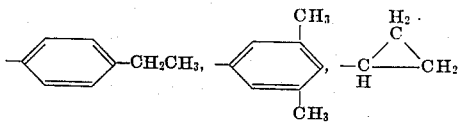

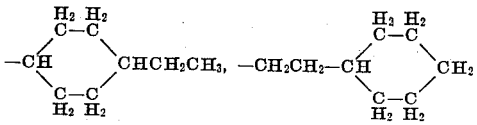

and the like.

The 4-aminobiphenyl may be prepared by conventional methods. Generally it is prepared by first nitrating biphenyl and then reducing the resulting nitro compound to the corresponding amine. The biphenyl compounds capable of being hydrolyzed to 4-aminobiphenyl may be prepared by any conventional means known in the art. For example, 4-biphenyl isothiocyanate may be prepared by reacting 4-aminobiphenyl with thiophosgene, and 4-biphenyl isocyanate may be prepared by reacting 4-aminobiphenyl with phosgene.

The nematocides of the present invention may be introduced into the soil "as is" or in a variety of nematocidal compositions. The nature of these compositions will depend primarily upon the particular composition contemplated. The compositions may be applied to the nematode-infested soil in any conventional manner as by spraying, drenching or dusting. The term "soil" as used herein is intended to include any medium capable of supporting the growth of plants. It is therefore intended to include, in addition to soil, humus, manure, compost, sand and artificial plant growth media, including hydroponic media.

In a preferred embodiment of the invention, the nematocides are distributed in the soil by introduction in water such as that employed to irrigate the soil. In this procedure the amount of water may be varied in accordance with the moisture equivalent of soil in order to obtain the desired depth of distribution of the toxic compound.

The nematocides described above may also be formulated as dust or granular compositions containing carrier or fillers such as talc, sand, fuller's earth, chalk, gypsum, etc., including active ingredients such as fertilizers, insecticides and fungicides. Generally, the nematocides may be used for controlling nematodes in either pre-emergence or post-emergence treatments without substantially affecting crops planted or growing in the soil.

The 4-aminobiphenyl and the suitable derivatives thereof are effective as nematocides when distributed in the infested soil at a dosage which is generally greater than about 10 pounds per acre and preferably between about 30 and about 250 pounds per acre. Particularly satisfactory results are obtained with use of about 50 to 200 pounds per acre. It is desirable that the soil be impregnated with nematocide to a depth of at least about 6 inches. It will be understood by those skilled in the art that minimal dosages are preferred when concerned with post-emergent treatments, generally about 10 to 150 pounds per acre being employed.

The following examples illustrate the invention, but are not to be construed as limiting the same.

EXAMPLE 1

The nematocidal activities of 4-aminobiphenyl and 4-isothiocyanato biphenyl were determined by preparing various strength water solutions of the two compounds and then adding one drop of a nematode culture to each solution. After 3 days, the results were observed and recorded as estimated percentage kill of nematodes. The results are given in the following table for three different concentrations of the compounds in water:

TABLE I

| Compound | % Kill after 3 days | | |
|---|---|---|---|
| | 125 ppm | 62.5 ppm | 31.2 ppm |
| 4-aminobiphenyl | 100 | 100 | 100 |
| 4-isothiocyanato biphenyl | 100 | 100 | 100 |

EXAMPLE 2

The procedure of Example 1 was repeated using a water solution containing 500 ppm of 4-biphenyl methylcarbamate, i.e.

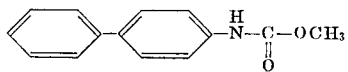

Results are given below in Table II.

TABLE II

| | % Kill after 3 days |
|---|---|
| | 500 ppm |
| 4-biphenyl methylcarbamate | 100 |

EXAMPLE 3

The procedure of Example 1 is repeated using the compounds listed in Table III below. Results are substantially similar to those of Example 1.

Table III

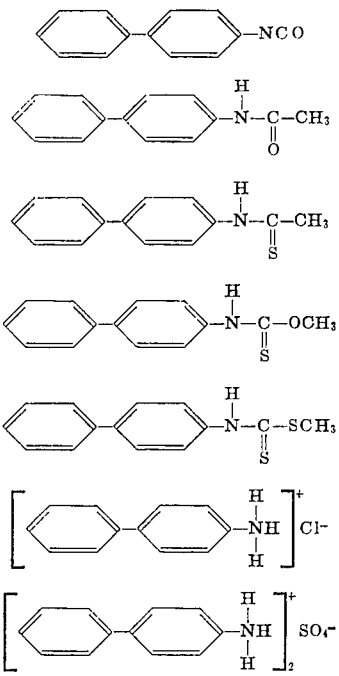

EXAMPLE 4

A post-emergent test is conducted by spraying 4-aminobiphenyl as an aqueous solution on soil around nematode-infested plants at a dosage of 150 pounds per acre. Soil samples are taken 12 months after treatment and examined as follows: Approximately 200 grams of soil are screened to remove roots and stems. This screened sample is extracted by the standard Baermann funnel technique for 24 hours. At the end of this period, 50 cc. of liquid is withdrawn and agitated. A 5 cc. portion of the extracted liquid is transferred to a Syracuse watch glass which had been marked off into 8 sections for counting purposes. Nematodes present in the samples are counted. The number of nematodes in the samples of treated soil are substantially less than in samples of untreated soil. Also, the appearance of the plants in the treated soil is superior to the appearance of the plants in the untreated soil.

We claim:
1. A process for controlling nematodes which comprises applying to said nematodes a nematocidal effective amount of 4-aminobiphenyl.

* * * * *